(No Model.)

G. W. MISKIMEN.
SEEDING MACHINE.

No. 322,841.      2 Sheets—Sheet 1.      Patented July 21, 1885.

WITNESSES:
Fred. G. Dieterich.
Wm. Bagger.

George W. Miskimen,
INVENTOR.
by Louis Bagger & Co.,
ATTORNEYS.

(No Model.) 2 Sheets—Sheet 2.

G. W. MISKIMEN.
SEEDING MACHINE.

No. 322,841. Patented July 21, 1885.

WITNESSES:
Fred. G. Dieterich
Wm. Bagger

George W. Miskimen
INVENTOR.
by Louis Bagger & Co.
ATTORNEYS.

UNITED STATES PATENT OFFICE.

GEORGE W. MISKIMEN, OF NEWCOMERSTOWN, OHIO.

SEEDING-MACHINE.

SPECIFICATION forming part of Letters Patent No. 322,841, dated July 21, 1885.

Application filed March 27, 1885. (No model.)

*To all whom it may concern:*

Be it known that I, GEORGE W. MISKIMEN, a citizen of the United States, and resident of Newcomerstown, in the county of Tuscarawas and State of Ohio, have invented certain new and useful Improvements in Seeding - Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
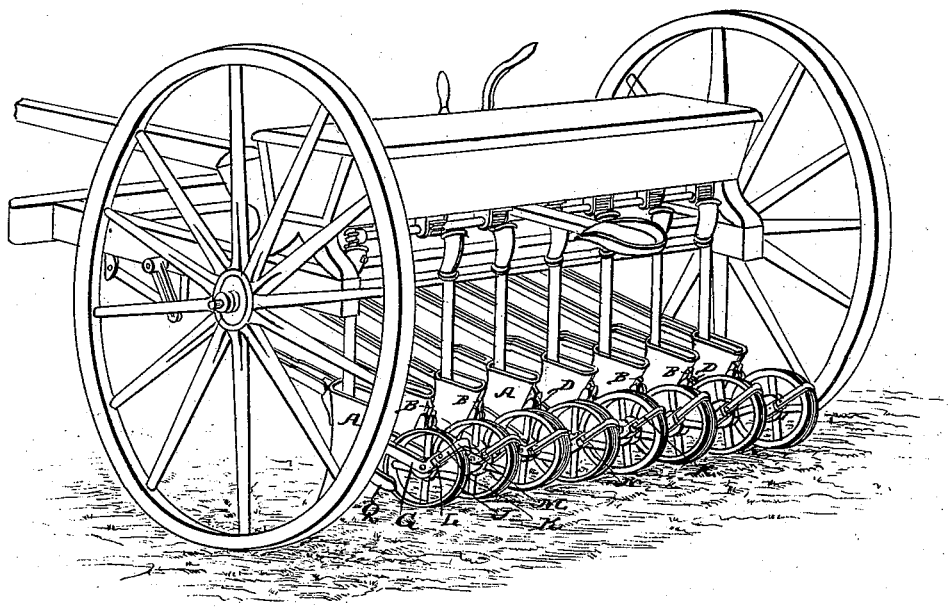
Figure 2:
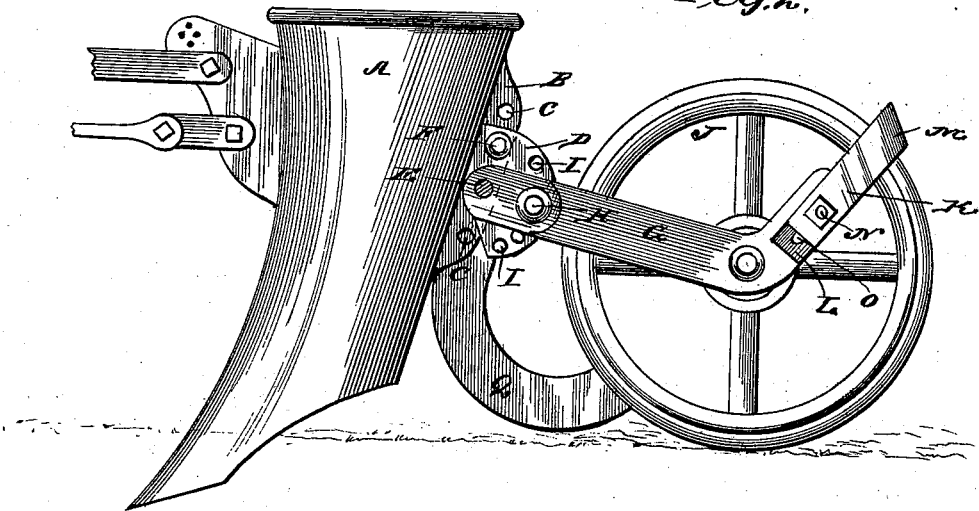
Figure 3:
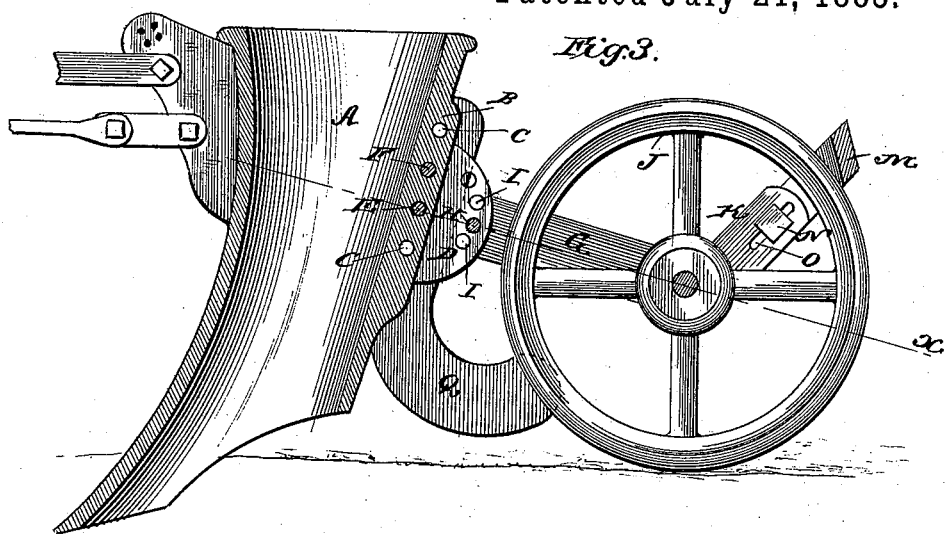
Figure 4:
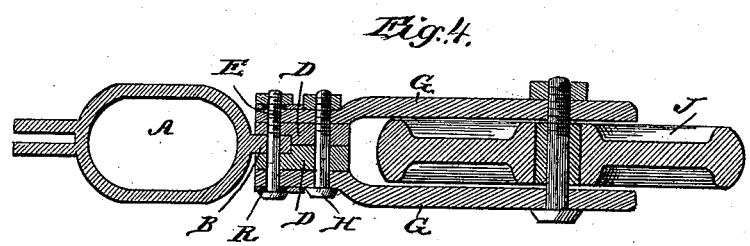
Figure 5:
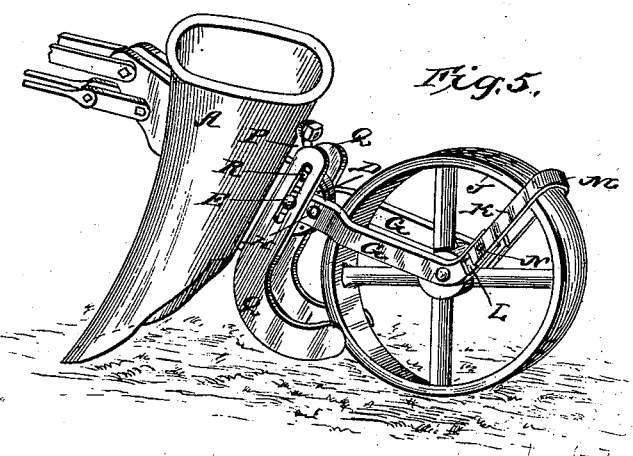

Figure 1 is a perspective view of a portion of a seeding-machine equipped with my improvements. Fig. 2 is a side view of one of the drills having my improvements attached thereto, the fender on one side having been removed for the purpose of showing the construction more clearly. Fig. 3 is a longitudinal vertical sectional view of the same. Fig. 4 is a horizontal sectional view taken on the line *x x* in Fig. 3; and Fig. 5 is a detail view showing the method of attaching my improvement to a drill-tube which has not been specially constructed for its reception.

The same letters refer to the same parts in all the figures.

This invention relates to that class of seeding-machines which are commonly known as "grain-drills," and it is an improvement on the device for which Letters Patent of the United States No. 312,148 were granted to myself on the 10th day of February, 1885. Said invention consisted in the application to the drill-tubes of weighted wheels or rollers for the purpose of regulating the depth of the shovels or furrow-openers and holding them to their work. My present improvement consists in the application to the said wheels or rollers of scrapers for the purpose of removing from their rims such particles of the soil as may adhere thereto, and fenders for the purpose of preventing stones or clods from dropping in front of the said wheels or rollers and interfering with their even and successful operation.

The invention further consists in the improved construction and arrangement of parts having for its object to provide a device which shall possess superior advantages in point of simplicity, durability, and general efficiency, and which may be readily attached to drill-tubes which have not been specially constructed for its reception, all as will be hereinafter more fully described, and particularly pointed out in the claim.

In the drawings hereto annexed, A designates a drill-tube, which is provided on its rear side with a vertical flange, B, having a series of perforations, C C.

D D are a pair of sector-shaped plates clamped or secured adjustably upon the flange B by means of transverse bolts E and F, upon the former of which a pair of arms, G G, is pivoted, as shown. Said arms are connected adjustably to the sector-shaped plates by means of a transverse bolt, H, which may pass through any one of a series of perforations, I I, in the said sector-shaped plates, near their periphery.

J designates the wheel or roller, which is journaled between the arms G G near their outer ends. It will be seen that by the double adjustment of the sector-shaped plates D D upon the flange B and of the arms G G upon the said sector-shaped plates, and the bolt E, the wheel or roller may be raised or lowered, as desired, and retained securely at any elevation or position to which it may be adjusted.

The outer or rear ends of the arms G G are extended diagonally in an upward direction, as shown at K, and provided with recesses L to receive the ends of the arms of a bail or scraper, M, which straddles the wheel or roller, and is secured adjustably to the arms K by means of bolts N, working in slots O in the said arms. This scraper is arranged to bear against the rim of the wheel or roller so as to remove from the latter such portions of the soil as may adhere thereto. I would have it understood, however, that the construction, as well as the arrangement or location of the said scraper, may be changed or modified without departing from the spirit of my invention.

In Figs. 1, 2, 3, and 4 of the drawings, the flange B has been shown as forming a permanent part of the drill-tube; but in Fig. 5 the flange is made separate, and secured to the drill-tube by means of bolts P P, the upper and lower ends of the said flange being provided with perforated lugs for the passage of the said bolts, while the drill-tube is provided with drilled openings for their reception. By this construction the improvement may be readily applied to drill-tubes of any construction.

Q Q designates a pair of suitably-constructed fenders, the arms or shanks of which are provided with slots R R, by means of which they are secured adjustably upon the bolt E adjoining the arms G G, as shown in the drawings. These fenders will serve to prevent clods, stones, and other obstructions from dropping into the furrow in front of the wheel or roller, which latter in passing over such obstructions would lift the drill and cause the seed to be left exposed or to be planted too shallow. If desired, these fenders, instead of being made adjustable, may be attached permanently to the arms G.

The operation and advantages of this invention will be readily understood from the foregoing description, taken in connection with the drawings hereto annexed. The wheel or roller will always run true in the track of the drill, and it may be adjusted vertically so as to gage or regulate the depth to which the drill or furrow-opener shall be allowed to work, thereby regulating the depth at which the seed is planted. The rim of the wheel also serves to cover the seed as it is planted, and presses the soil over it. The scraper serves to remove any particles of soil which may adhere to the rim of the wheel, and which, if allowed to remain, would raise or lift the rollers and the drills, causing the latter to make shallower furrows, or even to fail to enter the soil at all, in which case the seed would be left exposed upon the surface of the ground or be planted at too shallow a depth.

I would have it understood that this invention may be applied to all kinds of drills, whether hoe or shoe drills; also that I do not limit myself to the precise construction and arrangement of parts herein described, but reserve to myself the right to all such modifications as may be resorted to without departing from the spirit of my invention.

Having thus described my invention, I claim and desire to secure by Letters Patent of the United States—

In a seeding-machine, the combination, with a drill-tube, of a vertically-adjustable wheel or roller, and fenders arranged in front of the latter, substantially as set forth.

In testimony that I claim the foregoing as my own I have hereunto affixed my signature in presence of two witnesses.

GEORGE W. MISKIMEN.

Witnesses:
CLARENCE W. KNISELY,
ANDREW J. WILKIN.